United States Patent [19]
Huys

[11] Patent Number: 5,385,398
[45] Date of Patent: Jan. 31, 1995

[54] COMPACT DISC STORAGE SYSTEM

[75] Inventor: Erwin Huys, Kortrijk, Belgium

[73] Assignee: Beac Sarl, Luxembourg, Luxembourg

[21] Appl. No.: 937,890

[22] Filed: Sep. 30, 1992

[51] Int. Cl.⁶ ............................................. A47B 81/06
[52] U.S. Cl. .................................. 312/9.48; 220/505; 211/41; 312/9.55
[58] Field of Search .................... 312/9.47, 9.48, 9.52, 312/9.55; 206/387, 309; 211/41; 220/505

[56] References Cited

U.S. PATENT DOCUMENTS

| | | | |
|---|---|---|---|
| 3,288,543 | 11/1964 | Sugerman | 312/9.55 |
| 4,741,438 | 5/1988 | Mastronardo et al. | 206/309 |
| 5,184,736 | 2/1993 | Banker | 211/41 |
| 5,187,648 | 2/1993 | Ito | 211/41 |
| 5,191,977 | 3/1993 | Markovitz | 312/9.48 |
| 5,193,692 | 3/1993 | Farley et al. | 211/41 |
| 5,199,577 | 4/1993 | Curtis | 211/41 |
| 5,211,292 | 5/1993 | Paolucci | 211/41 |
| 5,214,572 | 5/1993 | Cosimano | 211/41 |

FOREIGN PATENT DOCUMENTS

| | | |
|---|---|---|
| 0155601 | 3/1985 | European Pat. Off. |
| 2561509 | 9/1985 | France |

*Primary Examiner*—Peter R. Brown
*Assistant Examiner*—Gerald Anderson
*Attorney, Agent, or Firm*—Charles F. Meroni, Jr.

[57] ABSTRACT

A compact disc storage system comprising at least two opposed walls having a plurality of spaced apart partitions disposed on the inside surface thereof so as to define a plurality of compartments, each compartment being sized to slidably receive a single compact disc box. Each partition is comprised of at least one spring element resiliently attached to the wall so as to be able to being pushed away in response to a pressure applied when a box of greater thickness than the spacing between adjacent partitions is slidably fitted within the compartment and to be able to be restored to its non-operated condition when said pressure is released.

8 Claims, 3 Drawing Sheets

COMPACT DISC STORAGE SYSTEM

FIELD OF THE INVENTION

This invention relates to a storage system for single and/or dual compact disc boxes.

BACKGROUND OF THE INVENTION

Various apparatus to store compact disc (CD) boxes are known. Most of them provide storage space for single CD boxes only. Some apparatus, however, are known to accept single as well as dual CD boxes.

An apparatus best known to store single as well as dual disc boxes is disclosed in U.S. Pat. No. 4,741,438. This prior art apparatus comprises two opposed walls having a first set of spaced apart ribs forming parallel compartments for receiving conventional dual CD boxes. A second set of shorter ribs are disposed between the first ribs with the spacing between one first rib and one adjacent second rib being sized to slidably receive two single CD boxes within every compartment. In this apparatus single CD boxes can be fitted only when removing a dual CD box and consequently single and dual CD boxes cannot be fitted in any order without the hazard of leaving blank spaces.

Another known apparatus also includes two sets of parallel ribs disposed on the inside surface of the walls. A first set of ribs are arranged on two opposed walls for slidably receiving single CD boxes, whereas a second set of ribs are arranged on two other opposed walls at right angles to the first walls for slidably receiving dual CD boxes. This prior art construction makes it possible to store single CD boxes in one position, e.g. in a horizontal position, or dual CD boxes in a perpendicular position, e.g. in a vertical position. However, this construction is unable to accept both single and dual CD boxes in any order in the same position.

Yet another prior art apparatus comprises parallel grooves are formed on the inside surface of two opposed walls, said grooves being defined between two fixed ribs, with a spacing about equal to the thickness of a dual CD box. Each groove is subdivided into two compartments by a movable element mounted so as to be pushed down when a dual CD box is slidably fitted between two fixed ribs. Each of the pair of compartments within a groove is suited for receiving a single CD box. This prior art construction also is unable to accept both single and dual CD boxes in any order without the hazard of leaving blank spaces.

SUMMARY OF THE INVENTION

It is an object of this invention to provide an improved storage system which is arranged to accept both single and double CD boxes in any order without leaving any blank space.

This object is attained according to the invention with a storage system comprising at least two opposed walls having a plurality of partitions disposed on the inside surface thereof, with the spacing between adjacent partitions being about equal to the thickness of a single CD box. Each partition is comprised of at least one spring element which is resiliently attached to the wall so as to be able to being pushed away in response to a pressure being applied to it when e.g. a dual CD box is slidably fitted within a connected compartment and to be able to being restored to its non-operated condition when said pressure is released.

With the construction of the invention any CD box, whether single or multiple, can be stored at any location and both single and dual or multiple CD boxes can be received in the compartments in any order. Further, the location of any CD box, whether single or multiple, can be readily changed without having to move or replace any part and without leaving any blank space.

For a better understanding of the invention reference is made to the following drawings and description.

DESCRIPTION OF THE PREFERRED EMBODIMENT

Figure 1:
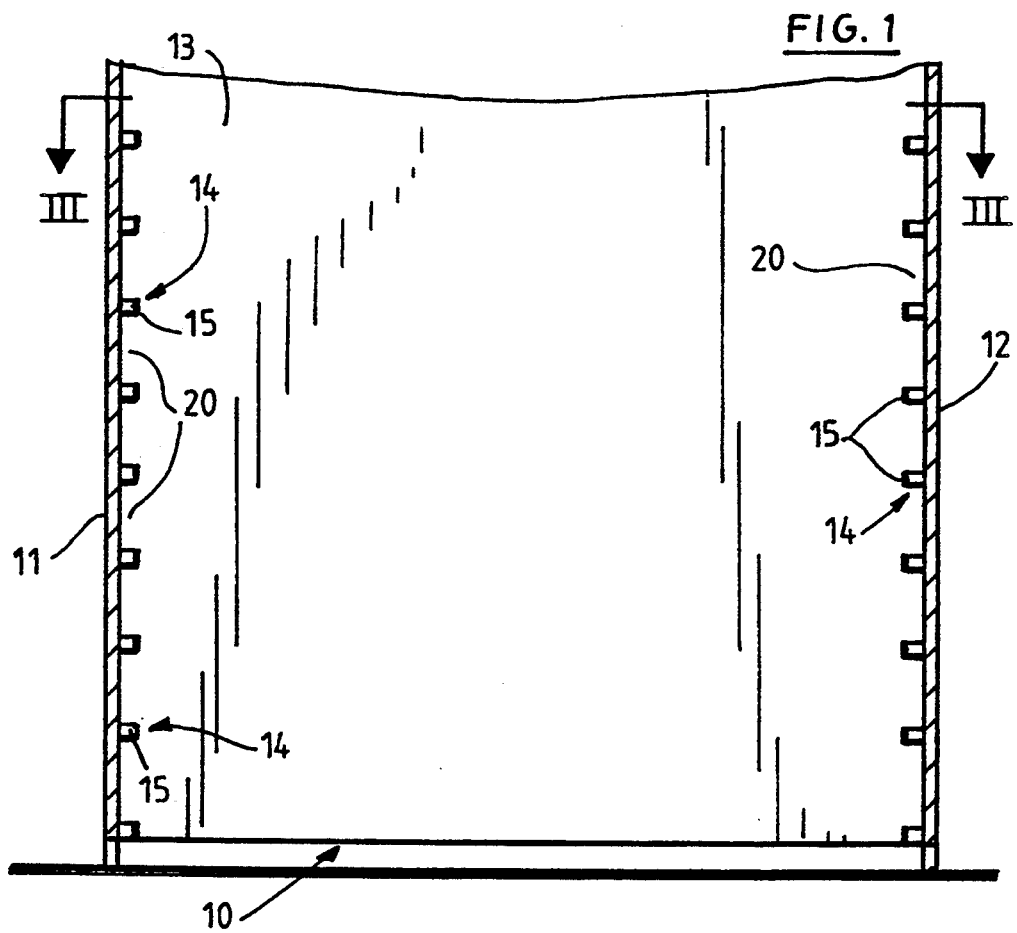
FIG. 1 is a fragmentary schematic front view of the CD storage system according to the invention.

Referring to the Figures there is shown an exemplary embodiment of the storage system according to the invention generally referred to by reference numeral 10. The system has opposed walls 11 and 12 and a rear wall 13. Top and bottom walls are not represented. On the inside surface of the opposed walls 11 and 12 are provided partitions 14 which define compartments 20 between opposed pairs of adjacent partitions. The spacing between adjacent partitions, i.e. the width of compartments 20, is about equal to the thickness of a conventional single compact disc box so that any compartment 20 is sized to slidably receive a single CD box 21 (see FIG. 2).

Figure 2:
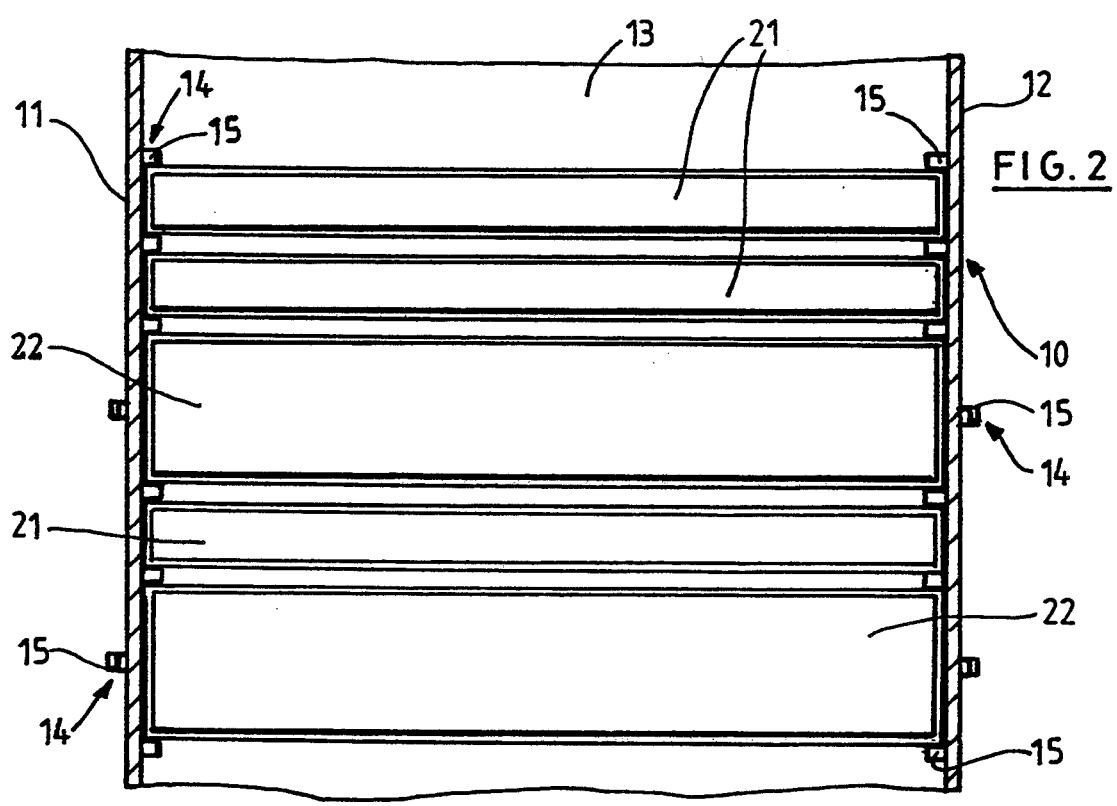
FIG. 2 shows the storage system of FIG. 1 with a number of single and dual CD boxes stored therein.
Figure 3:
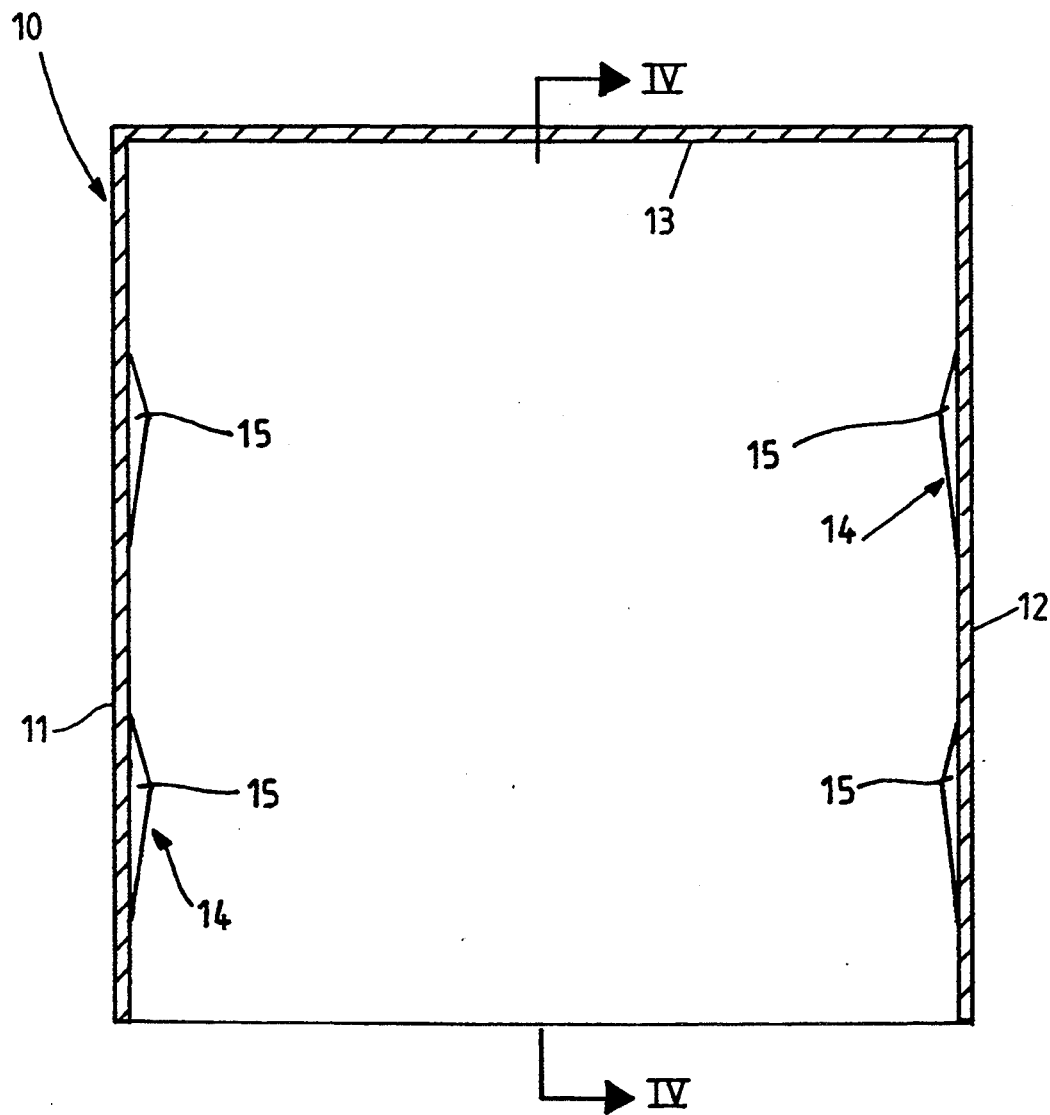
FIG. 3 is a sectional view taken along line III—III of FIG. 1.
Figure 4:
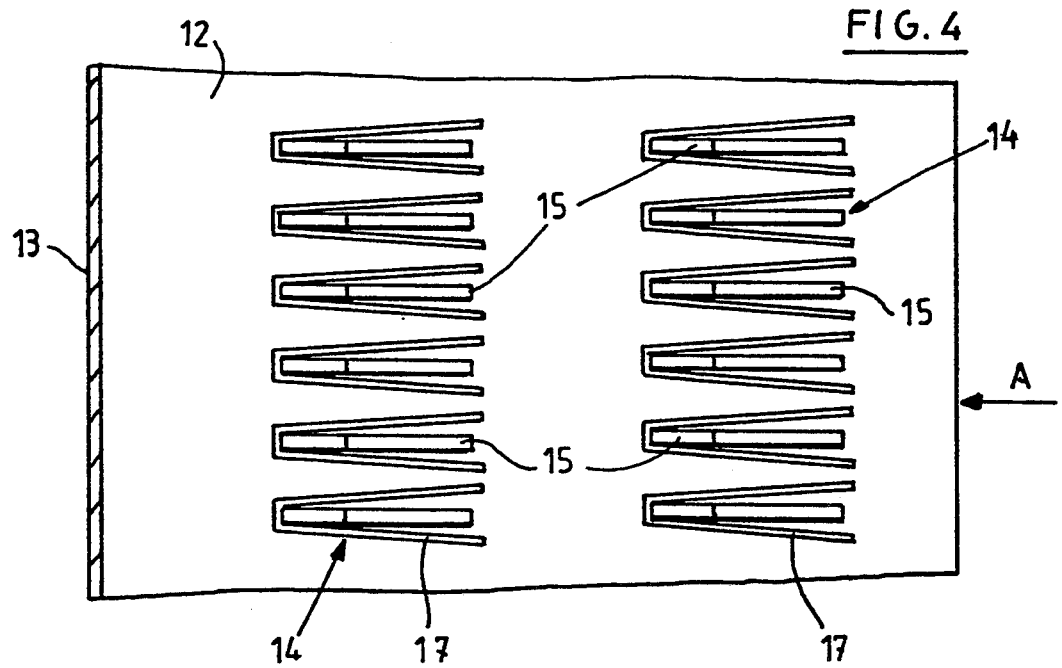
FIG. 4 is a sectional view taken along line IV—IV of FIG. 2.
Figure 5:
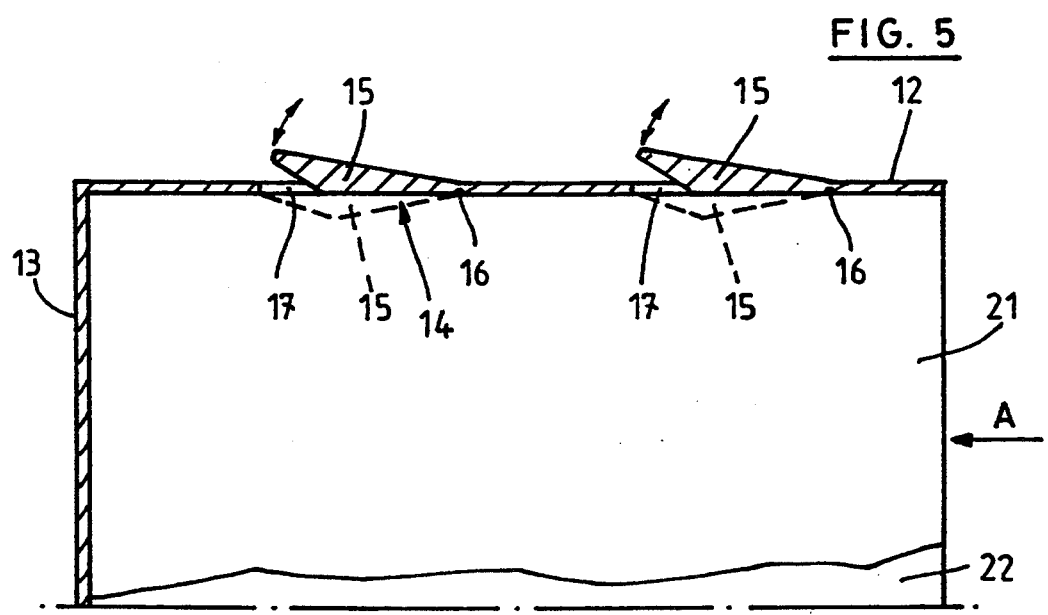
FIG. 5 is a fragmentary view showing two spring elements in operating condition.

Each partition is comprised of at least one spring element resiliently attached to the wall so as to be capable of being pushed down when a box having a greater thickness than the spacing between adjacent elements 14 is slidably fitted within a compartment. For instance, the spring elements 14 can be pivoted spring members as shown in FIGS. 3 and 5. Each member 15 is attached to the wall 11 or 12 at pivot axis 16. An opening 17 is formed by cutting out the spring member 15. The opening can also open into a recess formed in the wall. When a dual CD box such as box 22 in FIG. 2 or a thicker box is slidably fitted as indicated by arrow A, the pressure on member 15 causes it to pivot about pivot axis 16 and to be pushed down through opening 17, thereby allowing the box to be stored within a connected compartment. When removing the box, the spring member 15 is released and its pring capability causes it to be restored to its non-operated condition, whereby the member 15 serves as a partition again.

With this construction dual CS boxes or possibly multi CD boxes can be readily slidably fitted into the compartments and, more importantly, at any location within the storage system. Obviously, the system of the invention can also accept single CD boxes in the compartments 20, and another important advantage of the invention resides in that the system can readily slidably receive in any order both single CD boxes as well as dual CD boxes or any boxes containing any number of compact discs. FIG. 2 schematically shows an exemplary arrangement of three single CD boxes 21 and two dual CD boxes 22. This arrangement can be readily changed by simply removing some boxes and replacing them in a different arrangement.

It will be appreciated than the system of the invention can be used to store the CD boxes placed in either horizontal or vertical disposition.

Various modifications are with the contemplation of this invention without departing from the scope of the appended claims.

I claim:

1. A compact disc storage system comprising at least two opposed walls having a plurality of spaced arm partitions disposed on the inside surface thereof so as to define a plurality of compartments, each compartment being sized to slidably receive a single compact disc box of first thickness, each of said partitions being comprised of at least one spring element resiliently attached to the wall so as to be able to be pushed away from a compartment defining position in response to a pressure applied when a box of a second thickness greater than the spacing between adjacent partitions is slidably fitted between the two opposed walls and said partition capable of being restored to the compartment defining position when said pressure is released.

2. A system according to claim 1, wherein at least two spring elements are disposed in a line along the sliding direction of the compact disc boxes.

3. A system according to claim 1, wherein each spring element comprises a pivoted member resiliently attached to a wall for pivoting and to be pushed through an opening in the wall in response to pressure applied to said member and is restored to the compartment defining position when said pressure is released.

4. A system according to claim 3, wherein the opening is formed by cutting out a portion of the wall.

5. A system according to claim 3, wherein the opening is as associated with the member formed in the wall.

6. A system according to claim 2, wherein each spring element comprises a pivoted member resiliently attached to a wall for pivoting and to be pushed away from the wall in response to pressure applied to said member and is restored to said compartment defining position when said pressure is released.

7. A system according to claim 6, wherein the opening is formed by cutting out a portion of the wall.

8. A system according to claim 6, wherein the opening is formed about one of said partitions.

* * * * *